United States Patent
Chen et al.

(10) Patent No.: US 8,379,032 B2
(45) Date of Patent: Feb. 19, 2013

(54) SYSTEM AND METHOD OF MAPPING SHADER VARIABLES INTO PHYSICAL REGISTERS

(75) Inventors: Lin Chen, San Diego, CA (US);
Junhong Sun, San Diego, CA (US);
Guofang Jiao, San Diego, CA (US);
Chihong Zhang, San Diego, CA (US);
Lingjun Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1037 days.

(21) Appl. No.: 11/864,484

(22) Filed: Sep. 28, 2007

(65) Prior Publication Data
US 2009/0085919 A1    Apr. 2, 2009

(51) Int. Cl.
*G06F 15/00* (2006.01)
(52) U.S. Cl. .......................... 345/501; 345/559
(58) Field of Classification Search .................. 345/501, 345/559
See application file for complete search history.

(56) References Cited

U.S. PATENT DOCUMENTS

| 7,530,062 | B2 | 5/2009 | Aronson et al. | |
| 2006/0244753 | A1* | 11/2006 | Boyd et al. | 345/522 |
| 2007/0297501 | A1* | 12/2007 | Hussain et al. | 375/240 |
| 2008/0007559 | A1* | 1/2008 | Kalaiah et al. | 345/501 |
| 2009/0044112 | A1* | 2/2009 | Basso et al. | 715/706 |

OTHER PUBLICATIONS

International Search Report and Written Opinion—PCT/US2008/078005, International Searching Authority—European Patent Office, Feb. 3, 2009.
European Search Report—EP08006426, European Search Authority—The Hague—Jan. 27, 2009.

* cited by examiner

*Primary Examiner* — Maurice L McDowell, Jr.
(74) *Attorney, Agent, or Firm* — James R. Gambale, Jr.

(57) ABSTRACT

The present disclosure includes system and method of mapping shader variables into physical registers. In an embodiment, a graphics processing unit (GPU) and a memory coupled to the GPU are disclosed. The memory includes a processor readable data file that has a register file portion. The register file portion has a rectangular structure including a plurality of data items. At least two of the plurality of data items corresponding to data elements of a shader program. The data elements have different data storage types.

21 Claims, 7 Drawing Sheets

| Input Mapping Parameters | High Level Languages | | | | | | Low Level Languages | |
|---|---|---|---|---|---|---|---|---|
| | Uniform | Attribute | Varying | Built-in Uniform | Built-in Input | Built-in Output | Input | Output |
| User Defined Name | Yes | Yes | Yes | | | | | |
| Semantic | | | | | | | Yes | Yes |
| Key Word | | | | Yes | Yes | Yes | | |
| Data Types | All | Some | Some | Some | Some | Some | Some | Some |
| Array allowed | Yes | | Yes | | | Yes | | |
| Component mask | | | | | | | Yes | Yes |

SYSTEM AND METHOD OF MAPPING SHADER VARIABLES INTO PHYSICAL REGISTERS

FIELD

The present disclosure is generally related to graphics processing.

DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Graphics processing units (GPUs) can improve graphics processing and multimedia application performance by processing data associated with a graphics pipeline. GPUs can execute programs, commonly referred to as shaders, that may supplement or replace stages of a default graphics pipeline. Shaders may manipulate vertex data or scalar data and may be written in high-level or low-level programming languages. Shader compilers recognize and process a variety of data storage types by maintaining special rules and characteristics associated with the data storage types to produce executable code.

SUMMARY

In a particular embodiment, a communication device is disclosed. The communication device includes a graphics processing unit (GPU) and a memory coupled to the GPU. The memory includes a processor readable data file that has a register file portion. The register file portion has a rectangular structure including multiple data items. At least two of the data items correspond to data elements of a shader program that have different data storage types.

In another particular embodiment, a multimedia device is disclosed. The multimedia device includes a display and a graphics processing unit (GPU) coupled to the display. The multimedia device also includes an object file accessible to the GPU. The object file indicates a rectangular region of a register file for each data item of the object file.

In another particular embodiment, a method is disclosed that includes receiving a shader program including a plurality of data items. Each of the plurality of data items has a data storage type. The method also includes mapping each of the data items to a universal storage representation. The method further includes generating an object file using the universal storage representation to create a register file.

In another particular embodiment, a method is disclosed that includes compiling a shader program to generate a compiled output file. The method also includes providing the compiled output file to be executed by a wireless device having a graphics processing unit. The compiled output file identifies a plurality of rectangular regions of a register file. Each of the plurality of rectangular regions is associated with a respective data item of the compiled output file.

In another particular embodiment, a system is disclosed that includes means for locating a rectangular region of a register file corresponding to a data object. The system also includes graphics processing means for executing a shader program that accesses the data object.

In another particular embodiment, a processor readable medium is disclosed. The processor readable medium stores processor readable data to identify rectangular portions of a register file to a graphics processing unit. Each of the rectangular portions is associated with a respective shader data item.

One particular advantage provided by disclosed embodiments is a reduced compiler footprint due to a unified representation of shader variables.

Other aspects, advantages, and features of the present disclosure will become apparent after review of the entire application, including the following sections: Brief Description of the Drawings, Detailed Description, and the Claims.

DETAILED DESCRIPTION

Figure 1:
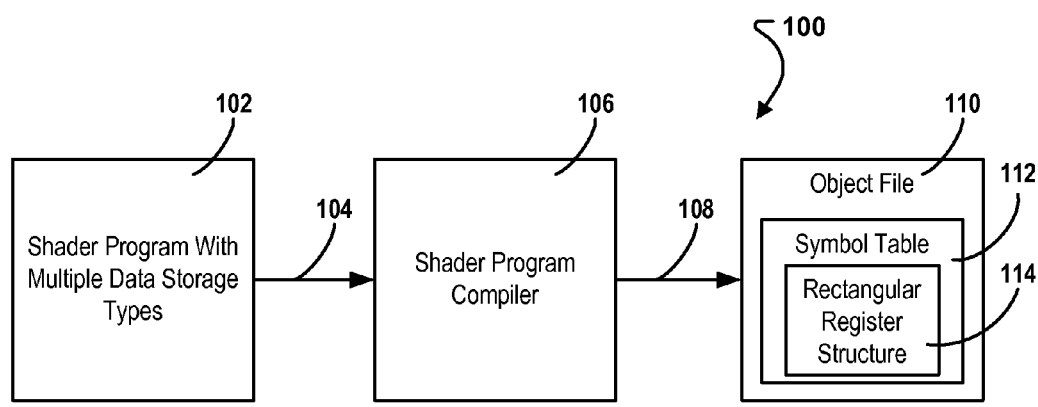
FIG. 1 is a functional diagram of a particular illustrative embodiment of a system to map shader variables to physical registers.

Referring to FIG. 1, a particular illustrative embodiment of a system to map shader variables to physical registers is disclosed and generally designated 100. The system 100 includes a shader program with multiple data storage types 102, a shader program compiler 106, and an object file 110. In a particular embodiment, the shader program with multiple data storage types 102, the shader program compiler 106, the object file 110, or any combination thereof, are stored in a memory of a portable wireless device that has a graphics processing unit (GPU).

The shader program with multiple data storage types 102 is input to the shader program compiler 106 via an input data stream 104. The shader program compiler 106 compiles the shader program and writes via an output data stream 108 to the object file 110. The object file 110 includes a symbol table 112 indicating data elements such as variables of the shader program with multiple data storage types 102.

In a particular embodiment, the shader program compiler 106 maps every data element of the shader program with multiple data storage types 102 to a respective universal storage representation for processing. Using the universal storage representation, the shader program compiler 106 may map each data element to a rectangular portion of a register file, indicated by a rectangular register structure 114, in the symbol table 112. The object file 110 may be executed by a graphics processing unit that reads and writes data corresponding to the data elements to physical registers as specified by the rectangular register structure 114.

Use of a universal storage representation for all shader program data storage elements may enable the shader program compiler 106 to operate with a smaller memory footprint than compilers that are configured to support each of the multiple data storage types throughout processing. Furthermore, because the shader program compiler 106 processes data elements using a universal storage representation, the compiler 106 is more easily revised to accommodate new shader programming languages and revisions to current shader specification standards, such as OpenGL.

Figure 2:
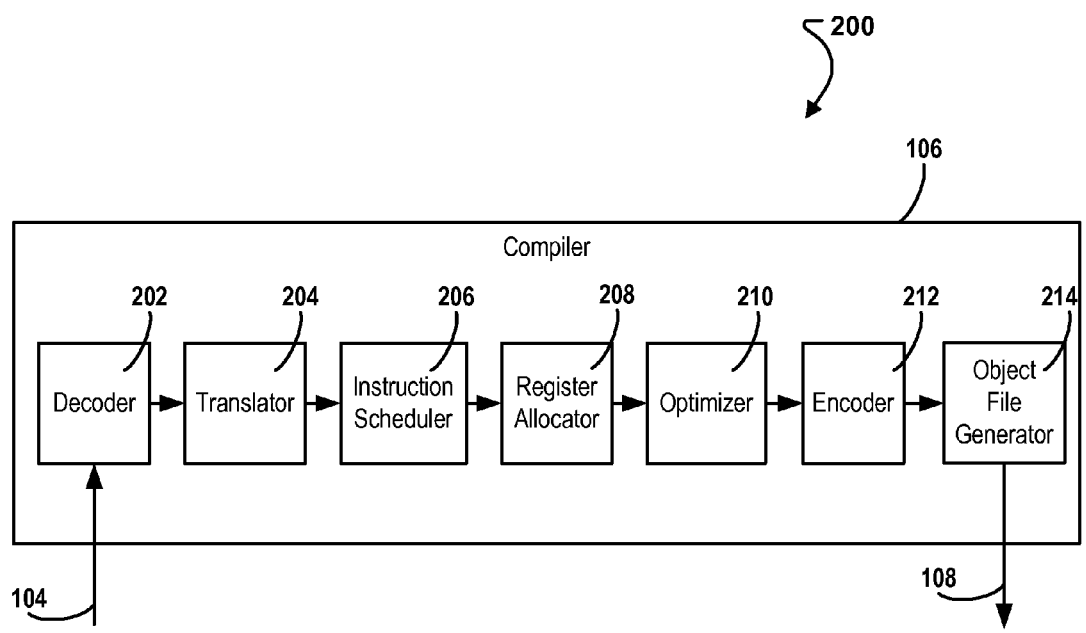
FIG. 2 is a functional diagram of a second illustrative embodiment of a system to map shader variables to physical registers.

Referring to FIG. 2, a second illustrative embodiment of a system to map shader variables to physical registers is depicted and generally designated 200. The system 200 includes the shader program compiler 106 configured to receive the input data stream 104 and to provide the output data stream 108, as illustrated in FIG. 1. The shader program compiler 106 includes a decoder 202, a translator 204, an instruction scheduler 206, a register allocator 208, an optimizer 210, an encoder 212, and an object file generator 214.

In a particular embodiment, the decoder 204 is configured to receive data elements associated with multiple data storage types and to map the input data storage types to a universal storage representation. The universal storage representation may provide a common representation of all shader variables for further processing by the shader program compiler 106. Each of the translator 204, instruction scheduler 206, register allocator 208, optimizer 210, encoder 212, and object file generator 214 may be configured to perform its respective function using the common representation. For example, the register allocator 208 may receive information from the instruction scheduler 206 corresponding to the universal storage representation of shader variables of the input data stream 104 and may map the shader variables to physical registers or portions of physical registers using the universal storage representation.

In a particular embodiment, the shader program compiler 106 is configured to receive shader program data that specifies data storage types associated with vertex data and also data storage types associated with pixel data, such as in a high-level shader programming language. The shader program compiler 106 may also be configured to receive shader program data that specifies logical input registers and logical output registers, such as in a low-level shader programming language. All input data storage types may be mapped to a universal storage representation at the decoder 202 for output to the translator 204. Thus, multiple data storage types may be processed at the shader program compiler 106 without implementing multiple parallel compilation paths to support each distinct data storage type throughout the compilation process.

Figures 3, 4:
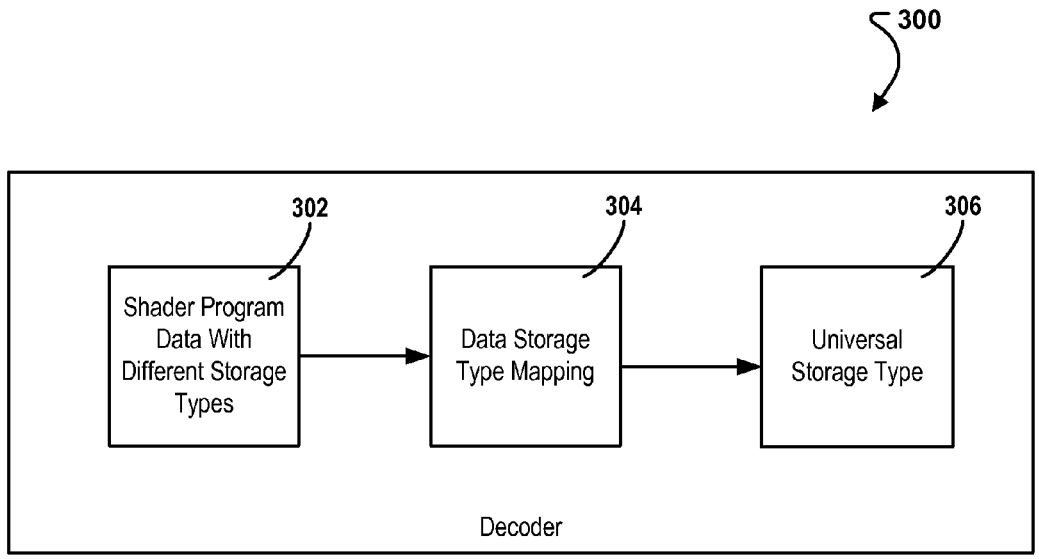
FIG. 3 is a functional diagram of a particular illustrative embodiment of a decoder that may be used in a system to map shader variables to physical registers.
FIG. 4 is a general diagram of a table to illustrate shader variable mapping input parameters.

Referring to FIG. 3, a particular embodiment of a decoder that may be used in a system to map shader variables to physical registers is depicted and generally designated 300. The decoder 300 is configured to provide shader program data with different storage types 302 to a data storage type mapping module 304 that is configured to output a representation of the shader program data using a universal storage type 306. In a particular embodiment, the decoder 300 may be used in a shader compiler, such as the shader program compiler 106 illustrated in FIGS. 1-2.

Referring to FIG. 4, a table illustrating shader variable mapping input parameters is depicted and generally designated 400. The table 400 includes columns for data elements associated with high-level shader languages, including uniform variables, attribute variables, varying variables, built-in uniform variables, built-in input variables, and built-in output variables. The table 400 also includes columns for data elements associated with low-level shader languages, including logical input registers and logical output registers. Input mapping parameters are depicted for each data element. For example, uniform variables have user-defined names, support all data types, and may include arrays. Examples of data types include basic data types such as float, vector2, vector3, vector4, matrix3, or matrix4, in an illustrative embodiment. Attribute variables have user-defined names and do not support all data types, nor do attribute variables support arrays. Varying variables have user-defined names and do not support all data types, and may include arrays. Built-in uniform, built-in input, and built-in output variables do not have user-defined names, and instead may be identified by reserved keywords. Examples of reserved keywords include gl_Position, gl_PointSize, gl_FragCoord, gl_FrontFacing, gl_FragColor, gl_FragData, and gl_PointCoord, in an illustrative embodiment. Logical input and output registers of low level languages also do not have user-defined names, and instead are identified by semantic identifiers. Further, logical input and output registers are described by a logical register number and component mask.

In a particular embodiment, each of the data storage types identified in the table 400 may be mapped to a universal storage representation by a shader compiler, such as by the decoder 202 of the shader program compiler 106, illustrated in FIG. 2. For example, the decoder 202 may define a structure including numeric values to identify input parameters including a name value, an array size value, and data type value, and output values including a register offset value, register count value, and a component mask value. The name value may enumerate key word values and semantics, and may store an index value into a separate name array for variables having user-defined names. The array value may indicate an array size or may store a zero value for no array. The register offset value may indicate a register number of a first register of a rectangular register footprint corresponding to the variable. The register count value may indicate a number of contiguous registers covered by the rectangular register footprint. The component mask may specify register components of the rectangular register footprint. For example, in an illustrative embodiment, each register may include four equally-sized components, and each rectangular register footprint may include from one to four contiguous components.

Figure 5:
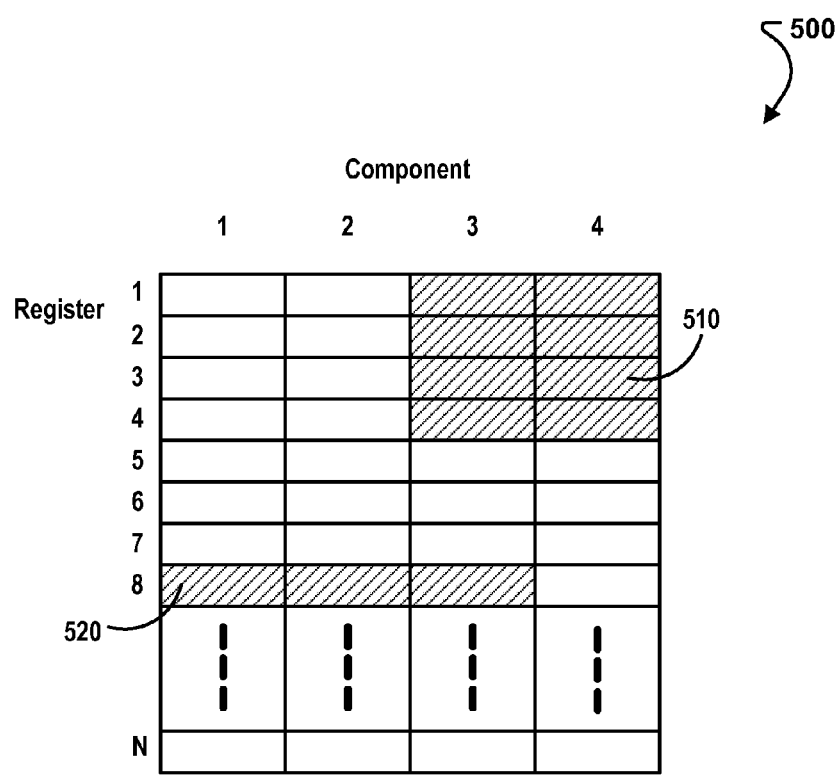
FIG. 5 is a general diagram of an embodiment of a register file.

Referring to FIG. 5, a particular illustrative embodiment of a register file is depicted and generally designated 500. The register file 500 includes a first rectangular region 510 and a second rectangular region 520. In a particular embodiment, the first rectangular region 510 and the second rectangular region 520 may be defined by an object file that is executable by a graphics processing unit (GPU).

The register file 500 includes N registers having one or more components. In an illustrative embodiment, N is thirty-two and each register includes four components of equal size.

Variables may be mapped to rectangular footprints such as the first rectangular region 510 and the second rectangular region 520. The first rectangular region 510 spans the third and fourth components of the first through fourth registers of the register file 500, and may be defined by a register offset value of zero (using zero-based indexing to identify the first register of the register file 500), a register count value of four (indicating that the first rectangular region 510 spans four registers), and an offset mask value indicating the third and fourth components. For example, the offset mask value may indicate a bit pattern that reflects components included in the first rectangular region, such as 0011, a true mask bit pattern such as 0x0000FFFF, an enumerated value that indicates the third and fourth components are included but the first and second components are excluded, or values indicating a starting component number and a number of components, as illustrative, non-limiting examples.

Similarly, the second rectangular region 520 spans three components of a single register. The second rectangular region 520 may therefore be designated by a register offset value of seven, a register count value of one, and an offset mask value of 1110, as an illustrative, non-limiting example.

In a particular embodiment, each register of the register file 500 may include thirty-two bits. The first rectangular region 510 may therefore include 128 bits, and may correspond to a single variable having 128 bits, or an array of two 64-bit values, four 32-bit values, or eight 16-bit values, as determined by the data type of the variable that is mapped to the first rectangular region 510. The second rectangular region 520 includes 24 bits, and may correspond to an array of three 8-bit values, for example.

Although the register file 500 is depicted as having four components of equal size, any number of registers and any configuration of components, of equal size or varying sizes, may be used. In addition, variables may be mapped to any number, size, and configuration of rectangular footprints in the register file 500. For example, a shader compiler may map shader variables to rectangular regions of the register file 500 based on algorithms to improve compiler speed, to improve runtime performance, to increase register usage, to achieve other performance or design goals, or any combination thereof.

Figure 6:
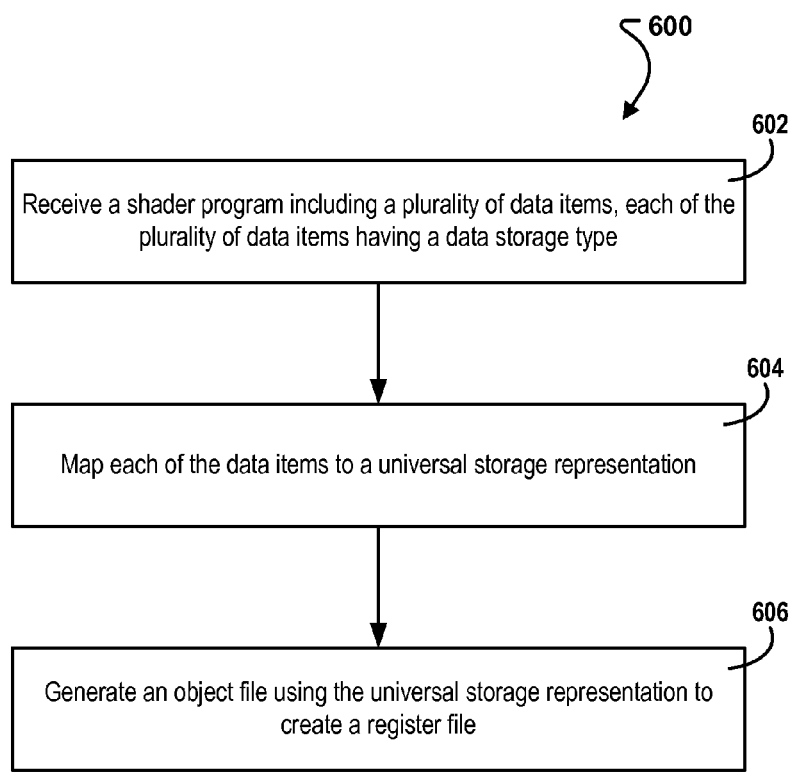
FIG. 6 is a flow chart of an embodiment of a method of mapping shader variables to physical registers.

Referring to FIG. 6, a particular illustrative embodiment of a method of mapping shader variables to physical registers is depicted and generally designated 600. A shader program is received that includes a plurality of data items, each of the plurality of data items having a data storage type, at 602. The shader program may include multiple different data storage types. In a particular embodiment, the shader program includes a first data item having a first data storage type and a second data item having a second data storage type, where the second data storage type is different from the first data storage type.

Continuing to 604, each of the plurality of data items is mapped to a universal storage representation. In a particular embodiment, each data item may be mapped to a respective portion of the register file identified by a register offset value, a register count value, and component mask.

Advancing to 606, an object file is generated using the universal storage representation to create a register file. In a particular embodiment, the register file may have a rectangular structure and may accessible to a graphics processing unit (GPU). For example, the object file may include a symbol table identifying rectangular portions of the register file for each data item, as illustrated in FIG. 5.

Figure 7:
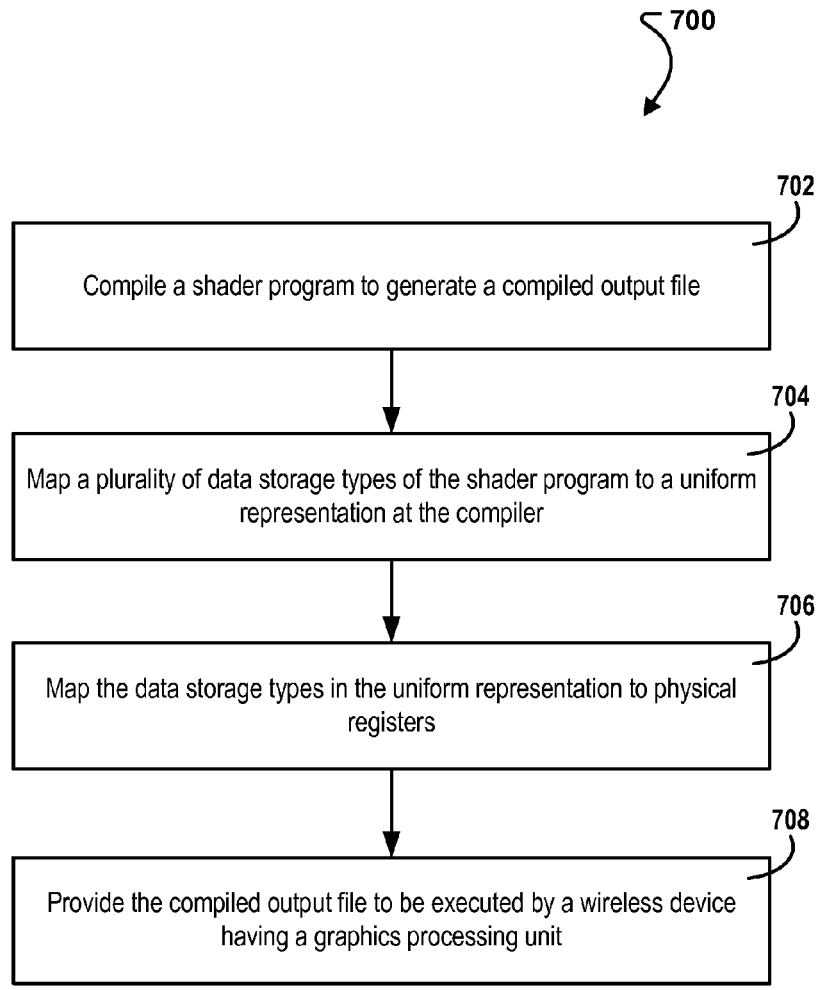
FIG. 7 is a flow chart of a second embodiment of a method of mapping shader variables to physical registers.

Referring to FIG. 7, a second illustrative embodiment of a method of mapping shader variables to physical registers is depicted and generally designated 700. A shader program is compiled to generate a compiled output file, at 702. The shader program may be performed by a shader compiler, such as the shader program compiler 106 illustrated in FIG. 1.

Continuing to 704, in a particular embodiment, a plurality of data storage types of the shader program may be mapped to a uniform representation at the compiler. For example, multiple different data storage types, such as the data storage types illustrated in FIG. 4, may be mapped to a universal storage representation by a decoder of a compiler, such as the decoder 300 illustrated in FIG. 3.

Moving to 706, in a particular embodiment, the data storage types in the uniform representation may be mapped to physical registers. For example, the data storage types in the uniform representation may be mapped to rectangular regions of a register file, such as first rectangular region 510 illustrated in FIG. 5. In a particular embodiment, each of the plurality of rectangular regions is defined by a starting register, a number of registers, and a number of contiguous register components.

Advancing to 708, the compiled output file is provided to be executed by a wireless device having a graphics processing unit (GPU). For example the compiled output file may be stored at a memory of the wireless device that is accessible by a GPU of the portable device. The compiled output file may identify a plurality of rectangular regions of a register file, and each of the plurality of rectangular regions may be associated with a respective data item of the compiled output file.

In a particular embodiment, the compiled output file may be transmitted to the wireless device via a wireless transmission. For example, instead of running a shader compiler at a portable device, shader programs may be compiled at a remote compiler and downloaded via wireless data transmission to the portable device for execution by a GPU of the portable device.

Figure 8:
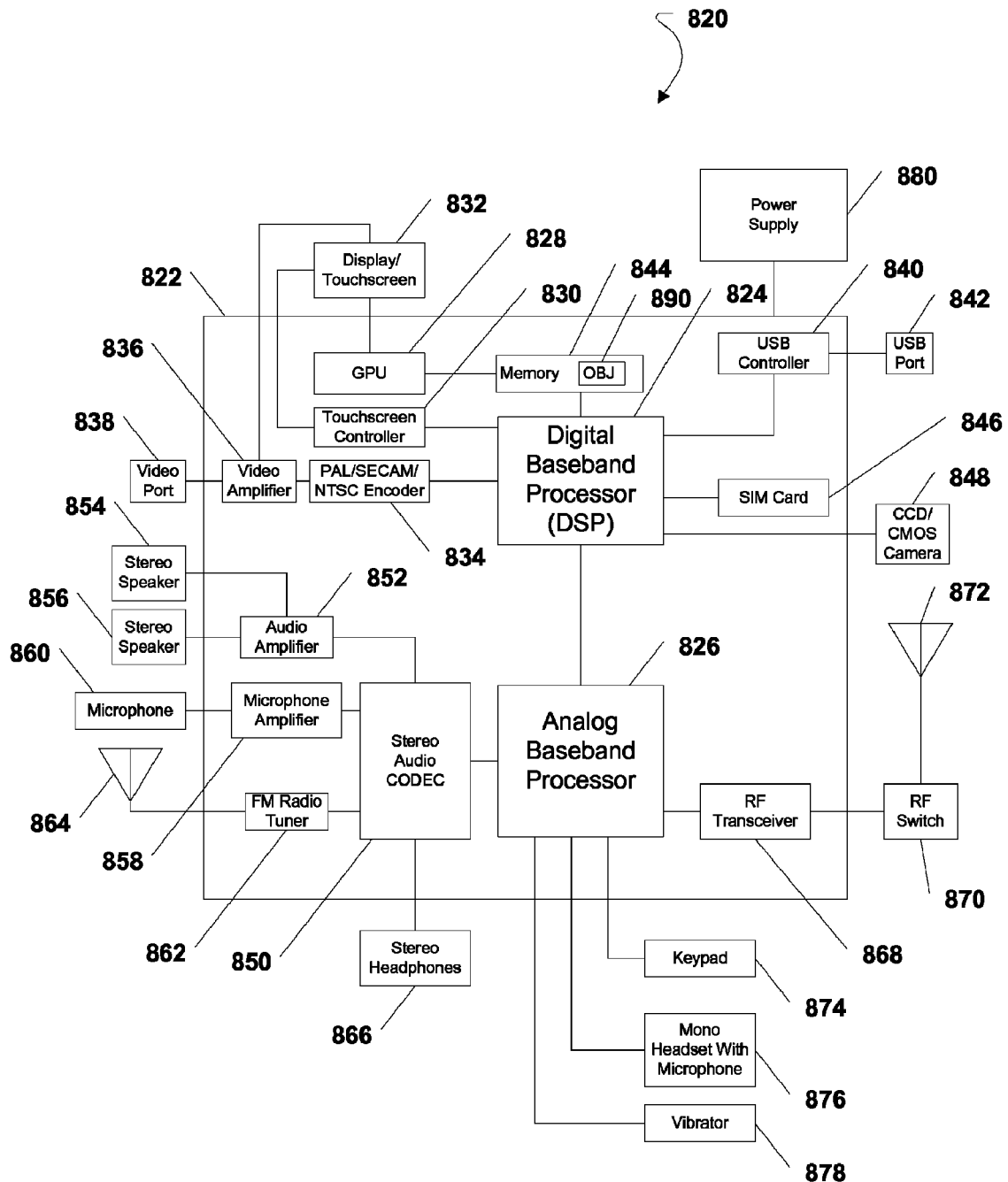
FIG. 8 is a block diagram of a cellular phone including a GPU and a memory including an object file that maps shader variables to physical registers.

Referring to FIG. 8, an exemplary, non-limiting embodiment of a cellular telephone is shown and is generally designated 820. As shown, the cellular telephone 820 includes an on-chip system 822 that includes a digital baseband processor 824 and an analog baseband processor 826 that are coupled together. The cellular telephone 820 also includes a graphics processing unit (GPU) 828 and a touchscreen controller 830 coupled to the digital baseband processor 824. In turn, a touchscreen display 832 external to the on-chip system 822 is coupled to the GPU 828 and the touchscreen controller 830.

In a particular illustrative embodiment, the GPU 828 may be may be configured to execute one or more object files 890 stored at a memory 844. The one or more object files 890 may include compiled shader programs that are executable by the GPU 828. The object files 890 may include a symbol table indicating a rectangular register structure for variables, such as the symbol table 112 illustrated in FIG. 1. In a particular embodiment, the cellular telephone 820 may include a shader compiler (not shown) configured to map shader variables to physical registers using a universal storage representation, such as the shader program compiler 106 illustrated in FIGS. 1-2. The cellular telephone 820 may be configured to receive shader source code, compiled shader files, the one or more object files 890, or any combination thereof, via wireless transmission from one or more remote sources.

FIG. 8 further indicates that a video encoder 834, e.g., a phase alternating line (PAL) encoder, a sequential couleur a memoire (SECAM) encoder, or a national television system(s) committee (NTSC) encoder, is coupled to the digital baseband processor 824. Further, a video amplifier 836 is coupled to the video encoder 834 and the touch screen display 832. Also, a video port 838 is coupled to the video amplifier 836. As depicted in FIG. 8, a universal serial bus (USB) controller 840 is coupled to the digital baseband processor 824. Also, a USB port 842 is coupled to the USB controller 840. The memory 844 and a subscriber identity module (SIM) card 846 can also be coupled to the digital baseband processor 824. Further, as shown in FIG. 8, a digital camera 848 can be coupled to the digital baseband processor 824. In an exemplary embodiment, the digital camera 848 is a charge-coupled device (CCD) camera or a complementary metal-oxide semiconductor (CMOS) camera.

As further illustrated in FIG. 8, a stereo audio CODEC 850 can be coupled to the analog baseband processor 826. Moreover, an audio amplifier 852 can coupled to the to stereo audio CODEC 850. In an exemplary embodiment, a first stereo speaker 854 and a second stereo speaker 856 are coupled to the audio amplifier 852. FIG. 8 shows that a microphone amplifier 858 can be also coupled to the stereo audio CODEC 850. Additionally, a microphone 860 can be coupled to the microphone amplifier 858. In a particular embodiment, a frequency modulation (FM) radio tuner 862 can be coupled to the stereo audio CODEC 850. Also, an FM antenna 864 is coupled to the FM radio tuner 862. Further, stereo headphones 866 can be coupled to the stereo audio CODEC 850.

FIG. 8 further indicates that a radio frequency (RF) transceiver 868 can be coupled to the analog baseband processor 826. An RF switch 870 can be coupled to the RF transceiver 868 and an RF antenna 872. As shown in FIG. 8, a keypad 874 can be coupled to the analog baseband processor 826. Also, a mono headset with a microphone 876 can be coupled to the analog baseband processor 826. Further, a vibrator device 878 can be coupled to the analog baseband processor 826. FIG. 8 also shows that a power supply 880 can be coupled to the on-chip system 822. In a particular embodiment, the power supply 880 is a direct current (DC) power supply that provides power to the various components of the cellular telephone 820 that require power. Further, in a particular embodiment, the power supply is a rechargeable DC battery or a DC power supply that is derived from an alternating current (AC) to DC transformer that is connected to an AC power source.

In a particular embodiment, as depicted in FIG. 8, the touchscreen display 832, the video port 838, the USB port 842, the camera 848, the first stereo speaker 854, the second stereo speaker 856, the microphone 860, the FM antenna 864, the stereo headphones 866, the RF switch 870, the RF antenna 872, the keypad 874, the mono headset 876, the vibrator device 878, and the power supply 880 are external to the on-chip system 822. Moreover, in a particular embodiment, the digital baseband processor 824 can use interleaved multithreading in order to process the various program threads associated with one or more of the different components associated with the cellular telephone 820.

Figure 9:
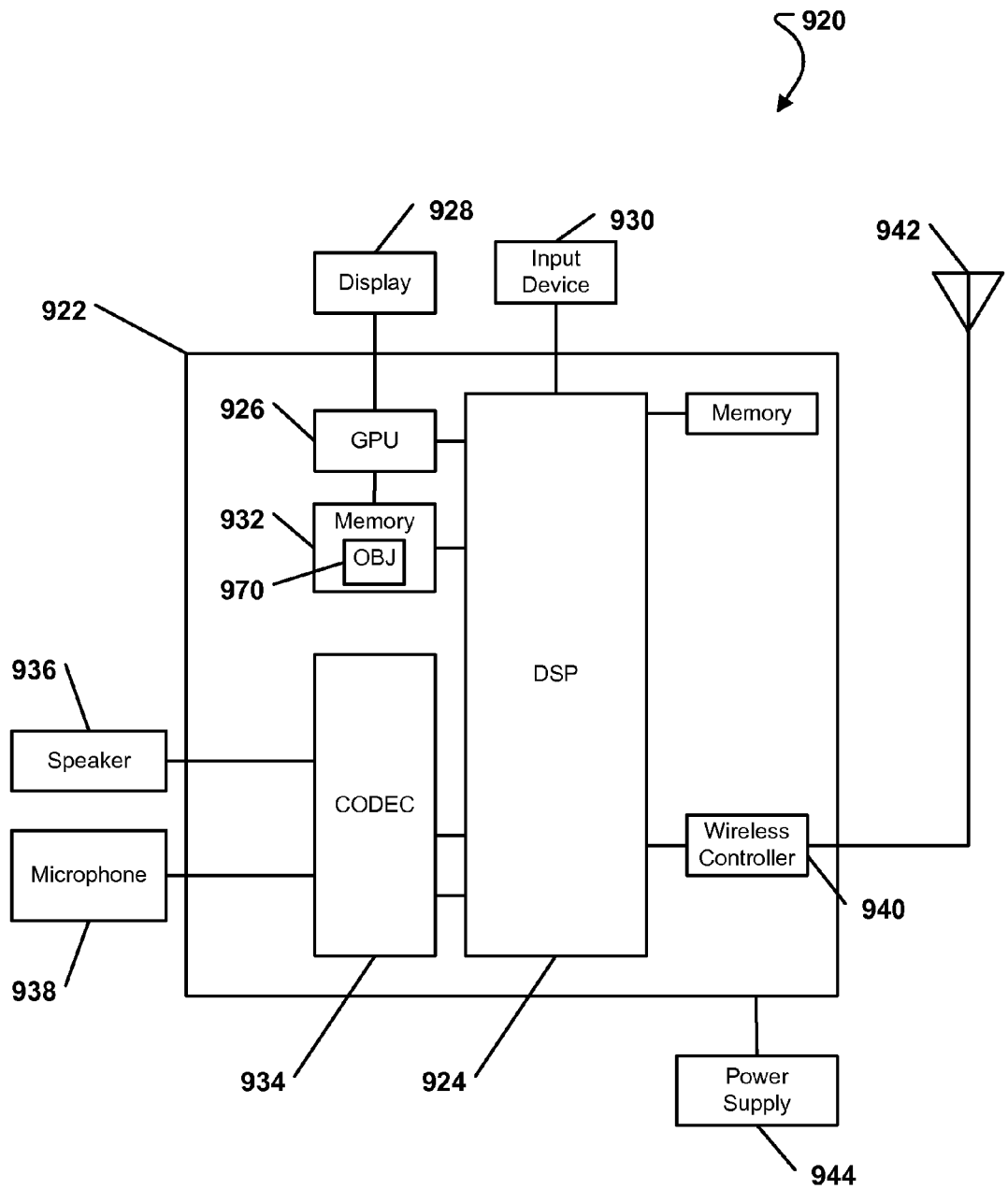
FIG. 9 is a block diagram of a portable communication device including a GPU and a memory including an object file that maps shader variables to physical registers.

FIG. 9 illustrates an exemplary, non-limiting embodiment of a portable communication device that is generally designated 920. As illustrated in FIG. 9, the portable communication device includes an on-chip system 922 that includes a digital signal processor 924 and a graphics processing unit (GPU) 926. In a particular illustrative embodiment, the GPU 926 may be may be configured to execute one or more object files 970 stored at a memory 932. The one or more object files 970 may include compiled shader programs that are executable by the GPU 926. The one or more object files 970 may include a symbol table indicating a rectangular register structure for variables, such as the symbol table 112 illustrated in FIG. 1. In a particular embodiment, the portable communication device 920 may include a shader compiler (not shown) configured to map shader variables to physical registers using a universal storage representation, such as the shader program compiler 106 illustrated in FIGS. 1-2. The portable communication device 920 may be configured to receive shader source code, compiled shader files, the one or more object files 890, or any combination thereof, via wireless transmission from one or more remote sources.

FIG. 9 also shows that the GPU 926 is coupled to the digital signal processor 924 and a display 928. An input device 930 and the memory 932 are also coupled to the digital signal processor 924. Additionally, a coder/decoder (CODEC) 934 can be coupled to the digital signal processor 924. A speaker 936 and a microphone 938 can be coupled to the CODEC 934.

FIG. 9 also indicates that a wireless controller 940 can be coupled to the digital signal processor 924 and a wireless antenna 942. In a particular embodiment, a power supply 944 is coupled to the on-chip system 922. Moreover, in a particular embodiment, as illustrated in FIG. 9, the display 928, the input device 930, the speaker 936, the microphone 938, the wireless antenna 942, and the power supply 944 are external to the on-chip system 922. However, each is coupled to a component of the on-chip system 922.

In a particular embodiment, the digital signal processor 924 utilizes interleaved multithreading to process instructions associated with program threads necessary to perform the functionality and operations needed by the various components of the portable communication device 920. For example, when a wireless communication session is established via the wireless antenna 942 a user can speak into the microphone 938. Electronic signals representing the user's voice can be sent to the CODEC 934 to be encoded. The digital signal processor 924 can perform data processing for the CODEC 934 to encode the electronic signals from the microphone. Further, incoming signals received via the wireless antenna 942 can be sent to the CODEC 934 by the wireless controller 940 to be decoded and sent to the speaker 936. The digital signal processor 924 can also perform the data processing for the CODEC 934 when decoding the signal received via the wireless antenna 942.

Further, before, during, or after the wireless communication session, the digital signal processor 924 can process inputs that are received from the input device 930. For example, during the wireless communication session, a user may be using the input device 930 and the display 928 to surf the Internet via a web browser that is embedded within the memory 932 of the portable communication device 920. The digital signal processor 924 can interleave various program threads that are used by the input device 930, the GPU 926, the display 928, the CODEC 934 and the wireless controller 940, as described herein, to efficiently control the operation of the portable communication device 920 and the various components therein. Many of the instructions associated with the various program threads are executed concurrently during one or more clock cycles. As such, the power and energy consumption due to wasted clock cycles is substantially decreased.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A communication device comprising:
    a graphics processing unit (GPU); and
    a memory coupled to the GPU, the memory comprising a processor readable data file that includes a register file portion, the register file portion having a rectangular structure including a plurality of data items, at least two of the plurality of data items corresponding to data elements of a shader program, wherein the data elements comprise different data storage types that are each mapped to a universal storage representation by a compiler while compiling the shader program, and wherein the universal storage representation provides a common representation for the data elements.

2. The communication device of claim 1, further comprising:
    a processor coupled to the GPU and further coupled to the memory;
    a transceiver coupled to the processor;
    a codec coupled to the processor;
    a speaker coupled to the codec; and
    a display coupled to the GPU.

3. The communication device of claim 1, wherein the register file portion associates each data item of the plurality of data items to a respective portion of the register file that is identified by a register offset value, a register count value, and a component mask.

4. The communication device of claim 1, wherein the different data storage types are selected from an attribute type, a uniform type, a varying type, a built-in uniform type, a built-in input type, and a built-in output type.

5. The communication device of claim 1, wherein the processor readable data file is an object file.

6. The communication device of claim 5, wherein the object file includes a symbol table.

7. The communication device of claim 1, further comprising a processor, executing the compiler, that is configured to compile source code of the shader program into a format executable by the GPU.

8. The communication device of claim 7, wherein the processor, executing the compiler, is configured to compile source code of the shader program that is compliant with an OpenGL standard specification.

9. The communication device of claim 7, wherein the compiler includes a storage mapping module that is configured to map the data elements having the different data storage types to the universal storage representation.

10. The communication device of claim 1, wherein the communication device is a portable wireless device, the device further comprising:
    a display coupled to the GPU; and
    a receiver configured to receive data via a wireless network.

11. A multimedia device comprising:
    a display;
    a graphics processing unit (GPU) coupled to the display; and
    a processor, executing a shader compiler, configured to:
        receive data items, of a shader program, having different data storage types;
        map, with the shader compiler when compiling the shader program, each of the data items having the different data storage types to a universal storage representation that provides a common representation for the data items; and
        map, with the shader compiler when compiling the shader program, each of the data items in the universal storage representation to one or more rectangular regions of a register file to generate an object file accessible to the GPU.

12. The multimedia device of claim 11, wherein each of the data items in the universal storage representation is mapped to the one or more rectangular regions by a register offset value, a register count value, and an offset mask.

13. The multimedia device of claim 12, wherein the register count value identifies a number of registers.

14. The multimedia device of claim 12, wherein the offset mask identifies a number of components of the register file and a starting component.

15. A method comprising:
    compiling, with a processor, a shader program to generate a compiled output file,
    wherein compiling, with the processor, the shader program comprises:
        receiving data items, of the shader program, having different data storage types;
        mapping, during the compiling of the shader program, each of the data items having the different data storage types to a universal storage representation that provides a common representation for the data items; and
        mapping, during the compiling of the shader program, each of the data items in the universal storage representation to one or more rectangular regions of a register file to generate the complied output file; and
    providing, with the processor, the compiled output file to be executed by graphics processing unit.

16. The method of claim 15, wherein providing the compiled output file comprises transmitting the compiled output file to a wireless device that includes the graphics processing unit via a wireless transmission.

17. The method of claim 15, wherein each of the one or more rectangular regions is defined by a starting register, a number of registers, and a number of contiguous register components.

18. A system comprising:
means for compiling, executing on a processor, a shader program to generate a compiled output file, wherein the means for compiling the shader program comprises:
means for receiving data items, of the shader program, having different data storage types;
means for mapping, during the compiling of the shader program, each of the data items having the different data storage types to a universal storage representation that provides a common representation for the data items; and
means for mapping, during the compiling of the shader program, each of the data items in the universal storage representation to one or more rectangular regions of a register file to generate the compiled output file; and
graphics processing means for executing the compiled output file.

19. The system of claim 18,
wherein the one or more rectangular regions of a register file are part of a physical register.

20. A non-transitory processor readable medium comprising instructions executed by a processor that cause the processor to:
compile a shader program to generate a compiled output file, wherein the instructions to compile the shader program comprise instructions that cause the processor to:
receive data items, of the shader program, having different data storage types;
map, during the compiling of the shader program, each of the data items having the different data storage types to a universal storage representation that provides a common representation for the data items; and
map, during the compiling of the shader program, each of the data times items in the universal storage representation to one or more rectangular regions of a register file to generate the complied output file; and
provide the compiled output file to be executed by a graphics processing unit.

21. The non-transitory processor readable medium of claim 20, wherein each of the one or more rectangular regions is identified by a register offset value, a register count value, and a component mask.

* * * * *